United States Patent
Fang et al.

(10) Patent No.: US 12,469,213 B2
(45) Date of Patent: Nov. 11, 2025

(54) METHOD, SYSTEM AND APPARATUS FOR GENERATING MULTI-DIMENSIONAL SCENE GRAPH WITH COMPLEX LIGHT FIELD

(71) Applicant: TSINGHUA UNIVERSITY, Beijing (CN)

(72) Inventors: Lu Fang, Beijing (CN); Zequn Chen, Beijing (CN); Haozhe Lin, Beijing (CN); Jinzhi Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 203 days.

(21) Appl. No.: 18/462,563

(22) Filed: Sep. 7, 2023

(65) Prior Publication Data
US 2024/0303914 A1   Sep. 12, 2024

(30) Foreign Application Priority Data
Mar. 10, 2023   (CN) .......................... 202310227248.0

(51) Int. Cl.
 *G06T 17/00*   (2006.01)
 *G06T 15/50*   (2011.01)
 (Continued)

(52) U.S. Cl.
 CPC ........ *G06T 15/506* (2013.01); *G06V 10/7715* (2022.01); *G06V 10/806* (2022.01)

(58) Field of Classification Search
 CPC .............. G06T 15/506; G06T 2210/12; G06T 2210/61; G06T 17/00; G06T 2207/20084;
 (Continued)

(56) References Cited

U.S. PATENT DOCUMENTS

| | | | |
|---|---|---|---|
| 12,062,200 B2 * | 8/2024 | McCormac | .......... G05D 1/2435 |
| 2024/0193855 A1 * | 6/2024 | Chai | .......... G06T 5/50 |

FOREIGN PATENT DOCUMENTS

| | | | | |
|---|---|---|---|---|
| CN | 115761036 A | * | 3/2023 | |
| JP | 7016058 B2 | * | 2/2022 | .............. B60R 1/00 |

OTHER PUBLICATIONS

Armeni, Iro et al. 3D Scene Graph: A Structure for Unified Semantics, 3D Space, and Camera [online]. Oct. 6, 2019 [retrieved on May 22, 2025]. Retrieved from the Internet: <URL: https://arxiv.org/pdf/1910.02527 > (Year: 2019).*

(Continued)

*Primary Examiner* — King Y Poon
*Assistant Examiner* — Michelle Hau Ma
(74) *Attorney, Agent, or Firm* — Hodgson Russ LLP

(57) ABSTRACT

In a method for generating a multi-dimensional scene graph with a complex light field, entity features of entities are obtained by inputting respective 2-Dimensional (2D) images captured in multiple view directions into an object detection model, and features of a respective single-view-direction scene graph are obtained by predicting a semantic relation among the entities contained in a corresponding 2D image captured in each view direction. An entity correlation for an entity among the multiple view directions is determined as an entity re-identification result. A multi-dimensional bounding box for the entity is established based on the entity re-identification result and a geometric constraint of camera parameters. A feature fusion result is obtained by fusing features of respective single-view-direction scene graphs in the multiple view directions. The multi-dimensional scene graph with the complex light field is established.

12 Claims, 5 Drawing Sheets

(51) Int. Cl.
*G06V 10/77* (2022.01)
*G06V 10/80* (2022.01)
*G06V 10/82* (2022.01)

(58) Field of Classification Search
CPC ............ G06V 10/7715; G06V 10/806; G06V 10/454; G06V 10/82
See application file for complete search history.

(56) References Cited

OTHER PUBLICATIONS

Wu, Shun-Cheng et al. SceneGraphFusion: Incremental 3D Scene Graph Prediction from RGB-D Sequences [online]. Mar. 31, 2021 [retrieved on May 22, 2025]. Retrieved from the Internet: <URL: https://arxiv.org/pdf/2103.14898 > (Year: 2021).*

Sitzmann, Vincent et al. Light Field Networks: Neural Scene Representations with Single-Evaluation Rendering [online]. Jan. 18, 2022 [retrieved on May 22, 2025]. Retrieved from the Internet: < URL: https://arxiv.org/pdf/2106.02634 > (Year: 2022).*

Ren, Shaoqing et al. Faster R-CNN: Towards Real-Time Object Detection with Region Proposal Networks [online]. Jan. 6, 2016 [retrieved on May 22, 2025]. Retrieved from the Internet: <URL: https://arxiv.org/pdf/1506.01497 > (Year: 2016).*

Wikipedia. Dempster-Shafer theory [online]. Nov. 8, 2020 [Date retrieved from Wayback Machine, accessed on May 23, 2025]. Retrieved from the Internet: <URL: https://en.wikipedia.org/wiki/Dempster%E2%80%93Shafer_theory > (Year: 2020).*

Carlone, Luca. Lecture 14: 2-view Geometry [Online]. 2021 Retrieved on Sep. 16, 2025]. Retrieved from the Internet: <URL: https://vnav.mit.edu/material/14-2viewGeometry-notes.pdf > (Year: 2021).*

* cited by examiner

METHOD, SYSTEM AND APPARATUS FOR GENERATING MULTI-DIMENSIONAL SCENE GRAPH WITH COMPLEX LIGHT FIELD

CROSS REFERENCE TO RELATED APPLICATIONS

This application claims priority to Chinese Patent Application No. 202310227248.0, filed on Mar. 10, 2023, the entire disclosure of which is incorporated herein by reference.

TECHNICAL FIELD

The disclosure relates to a field of multi-perspective image technology, in particular to a method for generating a complex 3-Dimensional (3D) light field scene graph, a system for generating a complex 3D light field scene graph, and an apparatus for generating a complex 3D light field scene graph.

BACKGROUND

Multi-dimensional light field understanding is a fundamental task of computer vision and is required for many applications in areas such as robotics and augmented reality or mix reality. 3-Dimensional Scene Graph (3DSG) aims to establish a graph including objects (such as 3D bounding box, colors, shapes and other attributes) and semantic relations among these object entities from multi-dimensional information in a given form (such as point clouds, RGBD images, panoramic images, and multi-perspective images). This form of representation is concise and clear, which facilitates completing more complex visual tasks such as image generation, scene manipulation, or visual question and answer.

SUMMARY

A first aspect of the disclosure provides a method for generating a multi-dimensional scene graph with a complex light field. The method includes:
  obtaining entity features of entities by inputting respective 2-Dimensional (2D) images captured in multiple view directions into an object detection model for object detection, and obtaining features of a respective single-view-direction scene graph by predicting, using an object relation prediction model, a semantic relation among the entities contained in a corresponding 2D image captured in each view direction;
  determining, based on a multi-view-direction consistency and a feature comparison result of the entity features, an entity correlation for an entity among the multiple view directions, as an entity re-identification result;
  establishing a multi-dimensional bounding box for the entity based on the entity re-identification result and a geometric constraint of camera parameters; and
  obtaining a feature fusion result by fusing, using a multi-view-direction information fusion algorithm, features of respective single-view-direction scene graphs in the multiple view directions, and establishing the multi-dimensional scene graph with the complex light field based on the feature fusion result and an inferred multi-dimensional semantic relation among entities based on the multi-dimensional bounding box.

A second aspect of the disclosure provides an electronic device includes a processor and a memory for storing a computer program executable by the processor. When the computer program is executed by a processor, the processor is configured to perform the method for generating a multi-dimensional scene graph with a complex light field as described above.

A third aspect of the disclosure provides a non-transitory computer-readable storage medium having a computer program stored thereon. When the computer program is executed by a processor of an electronic device, the processor is configured to perform the method for generating a multi-dimensional scene graph with a complex light field as described above.

Additional aspects and advantages of the disclosure will be given in part in the following description, and in part will become apparent from the following description, or be learned from the practice of the disclosure.

BRIEF DESCRIPTION OF THE DRAWINGS

The above and/or additional aspects and advantages of the disclosure will become apparent and easily understood from the following description of embodiments in combination with the accompanying drawings, in which.

DETAILED DESCRIPTION

Figure 1:
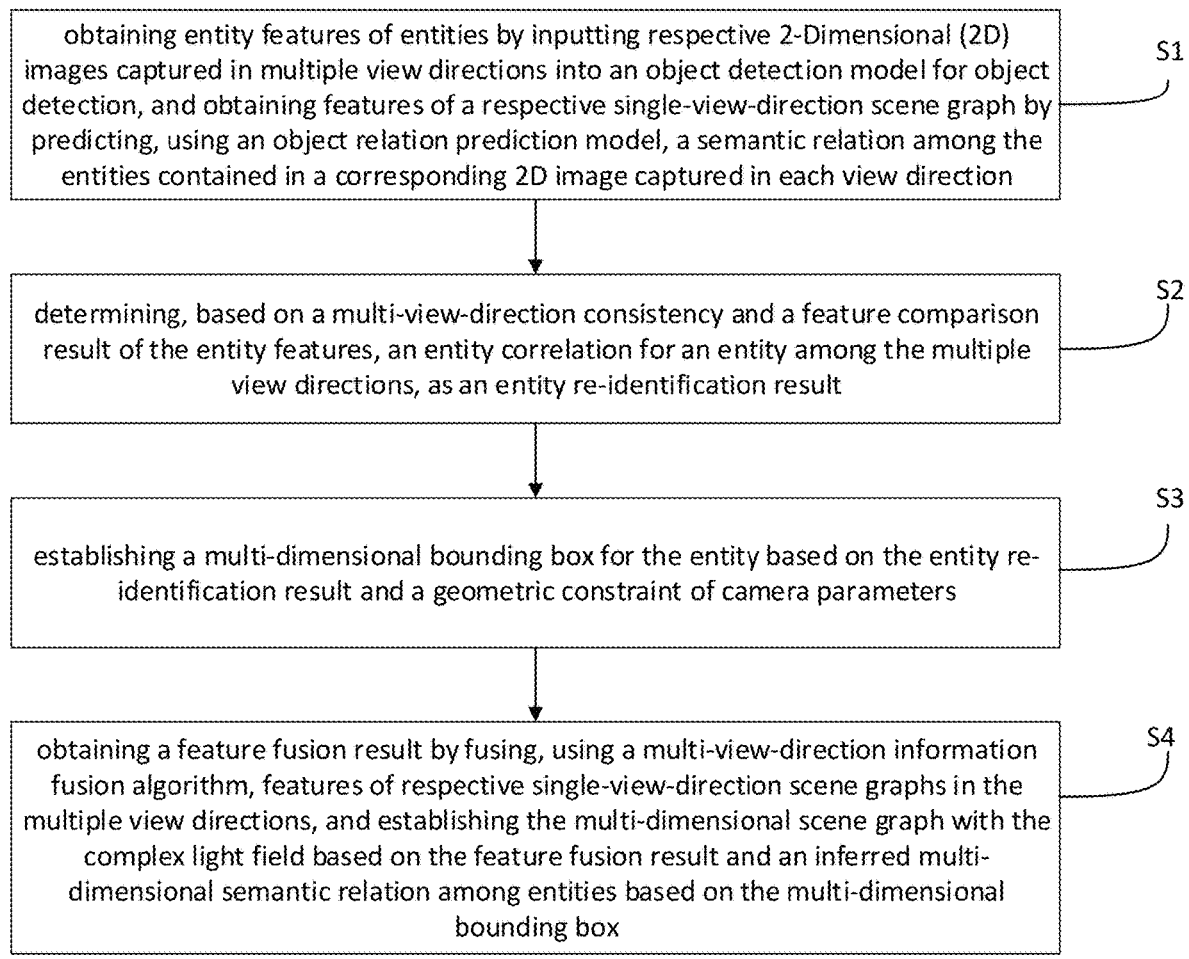
FIG. 1 is a flowchart of a method for intelligently generating a multi-dimensional scene graph with a complex light field according to embodiments of the disclosure.

It is to be noted that the embodiments and the features in the embodiments of the disclosure can be combined with each other without conflict. The disclosure will be described in detail below with reference to the accompanying drawings and in combination with the embodiments.

In order to enable those skilled in the art to better understand the scheme of the disclosure, the technical solutions in the embodiments of the disclosure will be clearly and completely described below in combination with the accompanying drawings in the embodiments of the disclosure. Obviously, the described embodiments are only a part of the embodiments of the disclosure, and not all of the embodiments of the disclosure. Based on the embodiments in the disclosure, all other embodiments obtained by those skilled in the art without inventive works shall fall within the scope of protection of the disclosure.

3DSG firstly proposes a dataset including semantically annotated multi-dimensional scene graphs. Starting from full scans and panoramic images of interior scenes, the 3DSG is treated as a hierarchical graph structure, where layers represent respective different entities such as building, room, object or camera. More layers can be added to represent other sources of semantic. Similar to 2D scene graph, each entity is added with some attributes and connected to other entities, to generate different types of relations. Starting from 2D, the information is gradually aggregated in 3D using two constraints, i.e., frame and multiperspective consistency. Each constraint provides a more robust final result and consistent semantic output.

Scene Graph Fusion proposes a method for incrementally generating globally consistent semantic scene graph in real time, which depends on geometric segmentation and a novel generalization graph network. The novel generalization graph network can handle missing edges and nodes in some multi-dimensional point clouds. Scene nodes are geometric fragments of the original shape, and their multi-dimensional features are propagated in a graph network of aggregated neighborhood segmentation features. The method predicts scene semantics and identifies object instances by learning the relations among over-segmented region clusters. The first online 3DSG prediction is proposed, where the prediction of the currently observed sub-graphs is gradually fused into a globally consistent semantic graph model. A new attention method is also introduced that can handle partial and incomplete 3D data, and the highly dynamic relations required for incremental SG prediction.

Although the 3DSG algorithm utilizing incremental information can be used to generate the 3DSG in real time, it is still difficult to realize the macroscopic real-time update of scene semantic information for the whole scene due to the difficulty of 3D information collection, which has a certain lag in timing. On the other hand, the processing of fine 3D scenes causes large computational overhead, which further limits the potential of the algorithm to achieve real-time full-scene representation.

Therefore, a method, a system, and an apparatus for intelligently generating a multi-dimensional scene graph with a complex light field are provided according to embodiments of the disclosure and will be described below with reference to the attached drawings.

FIG. 1 is a flowchart illustrating a method for intelligently generating a multi-dimensional scene graph with a complex light field according to embodiments of the disclosure.

As illustrated in FIG. 1, the method includes, but is not limited to, the following steps.

At step S1, entity features of entities are obtained by inputting respective 2-Dimensional (2D) images captured in multiple view directions into an object detection model for object detection, and features of a respective single-view-direction scene graph are obtained by predicting, using an object relation prediction model, a semantic relation among the entities contained in a corresponding 2D image captured in each view direction.

It is understandable that the term "view-direction" can be interchanged with the term "view".

For example, 2D images captured in at least two view directions are obtained. The at least two view directions at least includes a first view direction and a second view direction. First entity features of entities in a first view direction are obtained by inputting the 2D image captured in the first view direction into an object detection model for object detection and features of a first-view-direction scene graph are obtained by predicting, using an object relation prediction model, a first semantic relation among entities contained in the 2D image captured in the first view image. Second entity features of entities in the second view direction are obtained by inputting the 2D image captured in the second view direction into an object detection model for object detection, and features of a second-view-direction scene graph are obtained by predicting, using an object relation prediction model, a second semantic relation among entities contained in the 2D image captured in the second view image.

At step S2, an entity correlation for an entity among the multiple view directions is determined as an entity re-identification result, based on a multi-view-direction consistency and a feature comparison result of the entity features.

For example, an entity correlation for the same entity between the first view direction and the second view direction is determined as the entity re-identification result, based on the multi-view-direction consistency between the first view direction and the second view direction and a feature comparison result between the first entity features and the second entity features.

At step S3, a multi-dimensional bounding box for the entity is established based on the entity re-identification result and a geometric constraint of camera parameters.

For example, a 3D bounding box for the entity is established based on the entity re-identification result and the geometric constraint of camera parameters.

At step S4, a feature fusion result is obtained by fusing, using a multi-view-direction information fusion algorithm, features of respective single-view-direction scene graphs in the multiple view directions, and the multi-dimensional scene graph with the complex light field is established based on the feature fusion result and an inferred multi-dimensional semantic relation for the entity based on the multi-dimensional bounding box.

For example, a feature fusion result is obtained by fusing, using a multi-view-direction information fusion algorithm, the features of the first-view-direction scene graph and the features of the second-view-direction scene graph, and the 3D scene graph with the complex light field is established based on the feature fusion result and an inferred 3D semantic relation for the entity based on the 3D bounding box.

With the method, the system and the apparatus for intelligently generating a multi-dimensional scene graph with a complex light field, the generation of multi-dimensional scene graph with the complex light field can be realized, which greatly enhances the usage scenario and value of the 3DSG. The algorithm is simple and easy to implement through end-to-end training, and can be deployed in any indoor/outdoor scenes with multiple labeled views.

It is understandable that in the disclosure, multi-dimensional light field data are captured through high-definition (HD) cameras in multiple view directions. The object detection is performed respectively on the multi-dimensional light field data, and respective 2D scene graphs are generated. The identity of an object and the multi-dimensional bounding box are determined based on the camera parameters and multi-view-direction geometric constraints. According to the features obtained in generating respective 2D scene graphs in the multiple view directions, the true multi-dimensional semantic relation is predicted based on the identity, the consistency constraint and an information fusion algorithm, to obtain an accurate multi-dimensional semantic relation between instances contained in the scene, thereby enabling real-time dynamic scene understanding.

In detail, in the disclosure, for each view direction, the bounding box of an object entity; the category of the object entity, and the visual features of the object entity are obtained by performing, through the Faster Region Convolutional Neural Network (RCNN) algorithm, the object detection on the 2D image in that view direction. The semantic relation among entities contained in the 2D image in that view direction is predicted through a Neural-Motifs algorithm to obtain the single-view-direction scene graph and the features of the single-view-direction scene graph. The entity correlation (i.e., the re-identification) for the object entity among the view directions is determined based on the multi-view-direction consistency and the feature comparison for the object entity obtained in a first phase. The multi-directional bounding box is established based on object entity that is subjected to the re-identification among the multiple view directions and the geometric constraint of camera parameters. The scene graph features in the multiple view directions obtained in the first stage are fused by the multi-view-direction information fusion algorithm, to infer the accurate multi-dimensional semantic relation among entities and establish a complete multi-dimensional scene graph with the complex light field.

Figure 2:
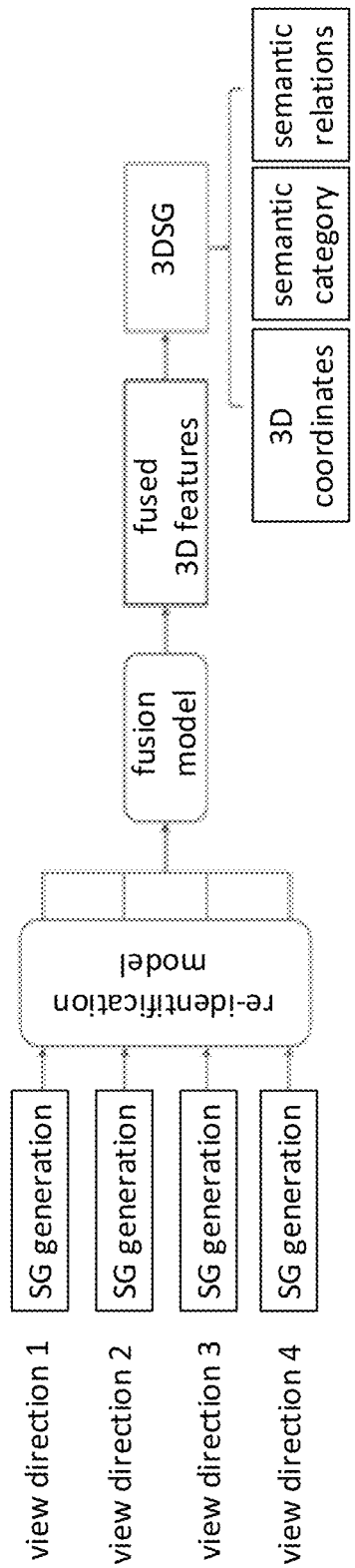
FIG. 2 is a schematic diagram illustrating a pipeline of algorithms used in a method for intelligently generating a multi-dimensional scene graph with a complex light field according to embodiments of the disclosure.

In an embodiment of the disclosure, as illustrated in FIG. 2, by extracting features from images in multiple view directions, by performing object detection on the 2D images in the multiple view directions through the Faster RCNN algorithm, by predicting the semantic relation among entities contained in each 2D image through the Neural-Motifs algorithm, by performing object re-identification based on the multi-view-direction consistency constraint and by obtaining the multi-dimensional bounding box of an object based on the geometric projection, the semantic relation among the entities in the multi-dimensional scene graph having information of the multiple view directions are inferred using the joint evidence and the Dirichlet distribution parameter.

Figure 3:
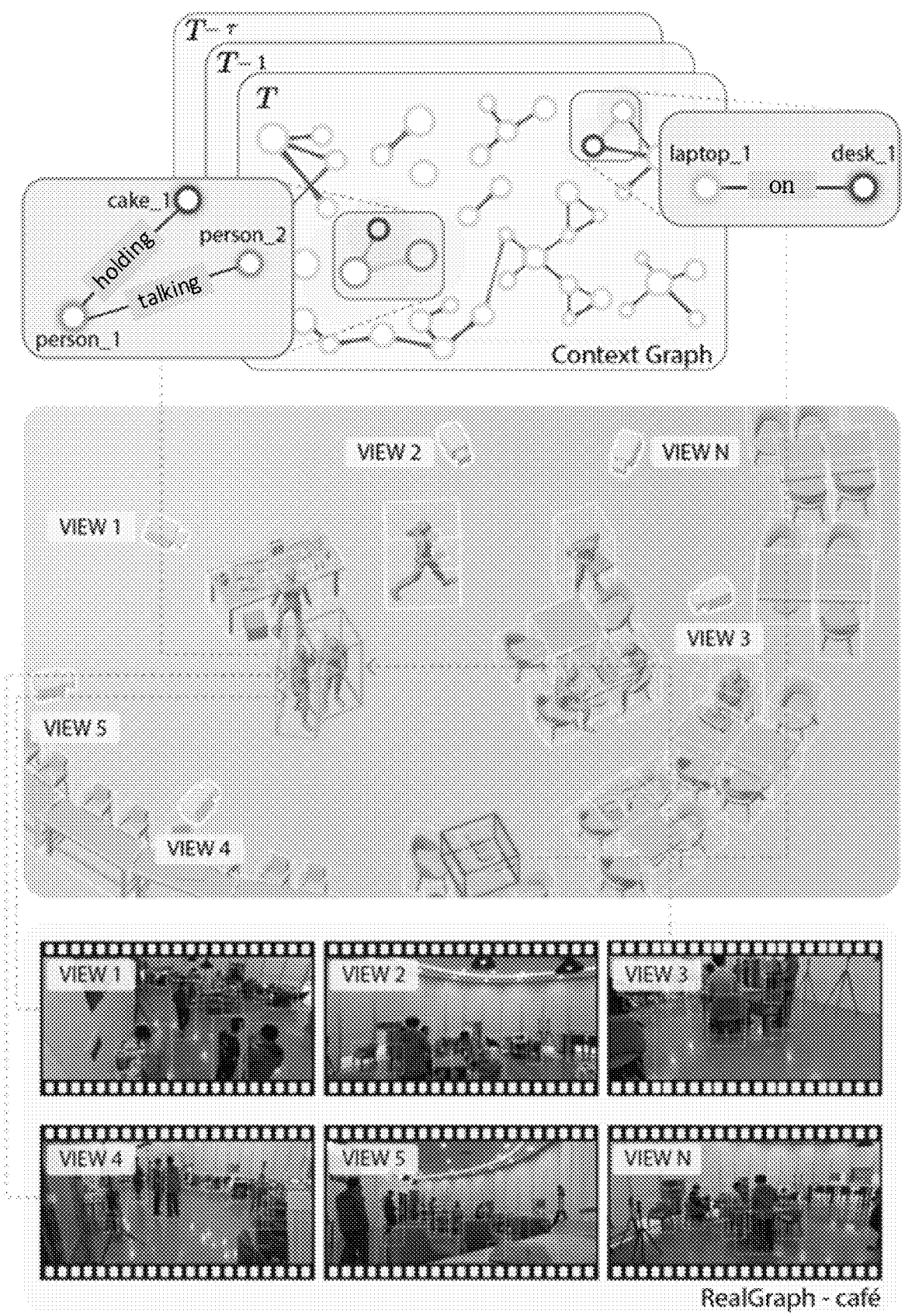
FIG. 3 is a schematic diagram illustrating semantic relations in a scene related to a method for intelligently generating a multi-dimensional scene graph with a complex light field according to embodiments of the disclosure.
Figure 4:
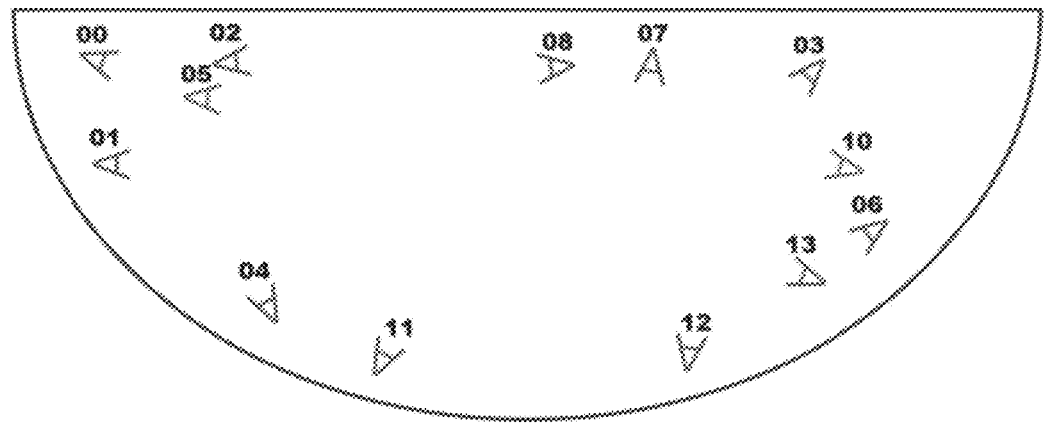
FIG. 4 is a schematic diagram illustrating a camera layout in a complex scene of a method for intelligently generating a multi-dimensional scene graph with a complex light field according to embodiments of the disclosure.

The flowchart of the algorithm used in the method for intelligently generating a multi-dimensional scene graph with a complex light field is further described below in combination with FIG. 3 and FIG. 4.

The object detection model is, for example, the Faster RCNN model. The Region Proposal Network (RPN) takes an image, such as a photo from a single view, as input and outputs a set of rectangular object proposals, and each of the proposals has a respective object score. The above process is modeled by a fully convolutional network with a loss function. The loss function is represented by:

$$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*).$$

in which, i represents a respective index of each anchor point: $p_i$ represents a prediction probability that an anchor i becomes an object, in which a basic ground-truth value label $p_i^*$ is 1 if the anchor is positive, and the basic ground-truth value label $p_i^*$ is 0 if the anchor is negative: $T_i$ represents a vector representing 4 parameterized coordinates of the multi-dimensional bounding box: $T_i$ represents a ground-truth bounding box associated with a positive anchor: $L_{cls}$ represents a classification loss: $L_{reg}$ represents a regression loss, which is defined as $L_{reg}(t_i, t_i^*)=R(t_i-t_i^*)$, where R is a predefined smooth L1 loss function, in which the classification loss and the regression loss are normalized using $N_{cls}$ and $N_{reg}$ respectively and balanced with 2.

The Stacked Motifs model configured for object relation prediction decomposes the probability of a graph G (consisting of a set of bounding regions B, object labels O, and labeled relations R) into three factors:

$$Pr(G|I)=Pr(B|I)Pr(O|B,I)Pr(R|B,O,I)$$

in which, the bounding box model Pr(B|I) is a standard object detection model, the object model Pr(O|B,I) creates a contextual representation of each box by linearizing B into a sequence and then processes this sequence by the LSTM. Similarly, when modeling the relation Pr(R|B,O,I), a respective representation of each object in the context is established by linearizing the predicted set of labeled objects O into another sequence and processing the sequence using another LSTM.

Further, performing object re-identification based on the multi-view-direction consistency constraint and the feature comparison includes the following.

An internal parameter matrix of the camera 1 represented by $K_1$ and an internal parameter matrix of the camera 2 represented by $K_2$ are obtained. An external parameter of a coordinate system 1 represented by R and an external parameter of a coordinate system 2 represented by t are obtained, where spatial points are mapped from the coordinate system 1 to the coordinate system 2. An image point of a world point P (unknown) on image 1 is represented by $P_1(u_1,v_1,1)$ (homogenized), and the image point of the world point P (unknown) on image 2 is represented by $P_2(u_2,v_2,1)$ (unknown, and homogenized). For example, the first camera is used for capturing the 2D image in the first view direction, and the second camera is used for capturing the 2D image of the second view direction.

Figure 7:
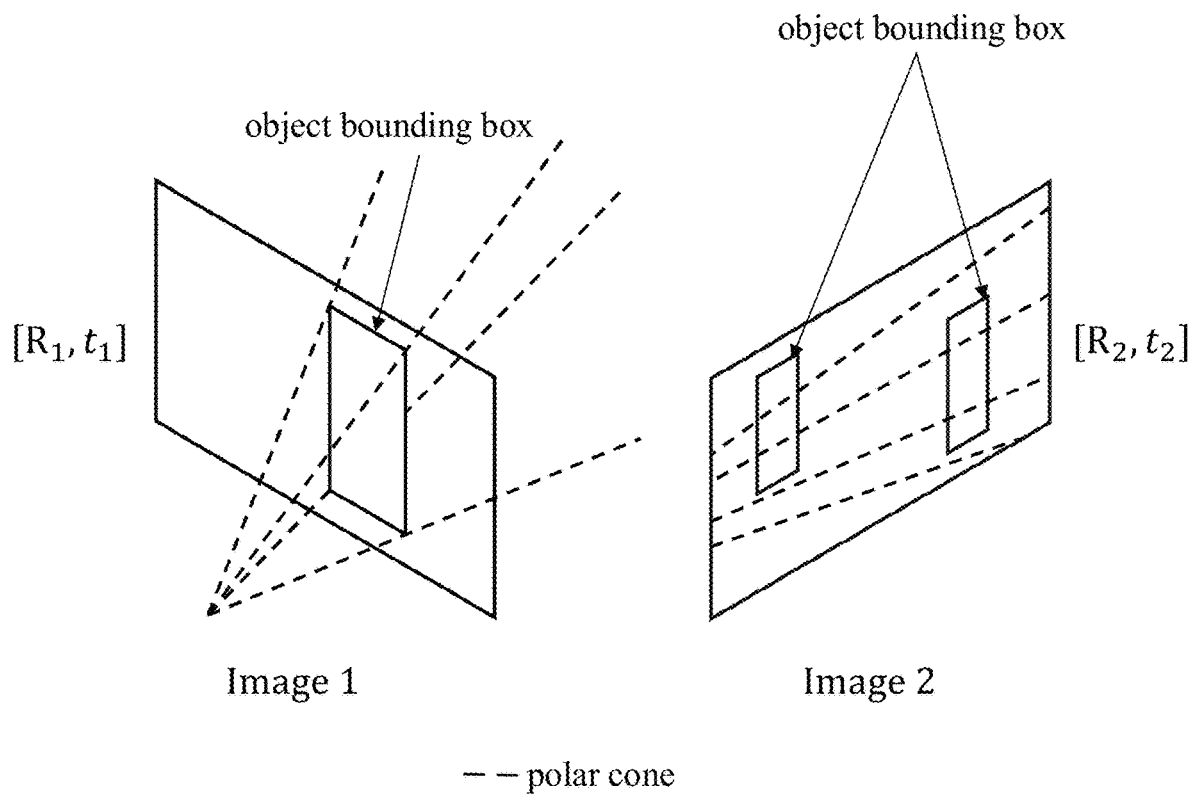
FIG. 7 is a schematic diagram illustrating polar cones for camera parameters associated with Image 1 and for camera parameters associated with Image 2.

As illustrated in FIG. 7, a 3D polar cone is generated by projecting the object bounding box in image 1 into 3D space using the camera parameters of camera 1, and a 2D polar cone is generated by projecting the 3D polar cone back onto a plane of image 2 using the camera parameters of camera 2. That is, the polar cone is obtained by transforming midpoints of vertical edges of the object bounding box of the camera 1 into a coordinate system of the camera 2 according to:

$$(u_2 \quad v_2 \quad 1)K_2^{-T} \cdot t^A \cdot R \cdot K_1^{-1} \begin{pmatrix} u_1 \\ v_1 \\ 1 \end{pmatrix} = 0.$$

The final entity re-identification result is obtained by comparing features between the object bounding box in the first camera and the object bounding box in the second camera. The polar cone of the object bounding box in the first camera intersects with the object bounding box in the second camera.

Further, the multi-view-direction information fusion algorithm is based on a Dempster Shafer evidence theory, which allows to fuse evidences from different sources, to obtain a belief degree (represented by a mathematical object called belief function). The object takes into account all available evidences. A Dempster fusion rule $M=\{\{b^k\}_{k=1}^K, u\}$ of two independent input signals with probability distribution $M_1=\{\{b_1^k\}_{k=1}^K, u_1\}$ and $M_2=\{\{b_2^k\}_{k=1}^K, u_2\}$ respectively is represented by:

$$b^k = \frac{1}{1-C}(b_1^k b_2^k + b_1^k u_2 + b_1^k u_1), u = \frac{1}{1-C} u_1 u_2$$

in which C represents a measures of confliction between two sets, $$\frac{1}{1-C}$$

represents a scale factor for normalization. The corresponding joint evidence and Dirichlet distribution parameter derived from multiple view directions are represented by:

$$S = \frac{K}{u}, e^k = b^k \times S, \alpha^k = e^k + 1.$$

An estimated multi-view-direction joint evidence e and a joint Dirichlet distribution parameter α are obtained based on the above fusion rule, and the final probability for each category and an overall uncertainty are generated.

Further, an object context model C is calculated by a bidirectional LSTM as follows:

$$C = biLSTM([f_i; W_1 l_i]_{i=1,\ldots,n}),$$

in which, $C=[c_1, \ldots c_n]$ contains hidden states of the final LSTM layer for each element of the linearized B, and $W_1$ is a parameter matrix that maps a distribution $l_i$ of prediction category to $R^{100}$. The biLSTM makes all elements of B provide information about the potential object identifier. An additional biLSTM layer establishes a contextual representation model of the bounding region B and the object O:

$$D = biLSTM([c_i; W_2 \hat{o}_i]_{i=1,\ldots,n}),$$

in which, the edge context $D=[d_1, \ldots d_n]$ contains the states of bounding regions in the last layer of the biLSTM, and $W_2$ is a parameter matrix that maps $\hat{o}_i$ to $R^{100}$.

Further, the result of the joint evidence and Dirichlet distribution parameters are ultimately used to infer the semantic relations among the entities in the 3DSG that fuses information from the multiple view directions, with the loss function defined as follows:

$$L(\alpha_i) = L_{ce}(\alpha_i) + \lambda_t KL[D(p_i | \tilde{\alpha}_i) || D(p_i | 1)],$$

in which, $L_{ce}$ is a cross-entropy function, and $\lambda_t$ is a balance factor. In practice, the value of $\lambda_t$ can be gradually increased, to avoid the network from focusing too much on KL divergence in the initial training stage, which leads to lack of sufficient search of parameter space and further leads to a flat uniform distribution of network output.

With the method for intelligent generating a complex multi-dimensional light field scene graph according to embodiments of the disclosure, the images in the multiple view directions are acquired, the images are processed by the deep neural network to obtain 2D semantic features in each view direction. The effective feature fusion is realized with the multi-view-direction consistency constraint using the internal and external parameters of the camera to establish multi-dimensional semantic features and to obtain the multi-dimensional semantic scene graph of the whole scene. This method can effectively reconstruct the semantic information of the multi-dimensional scene, which requires less cost of hardware system, the algorithm is simple and easy to implement.

Figure 5:
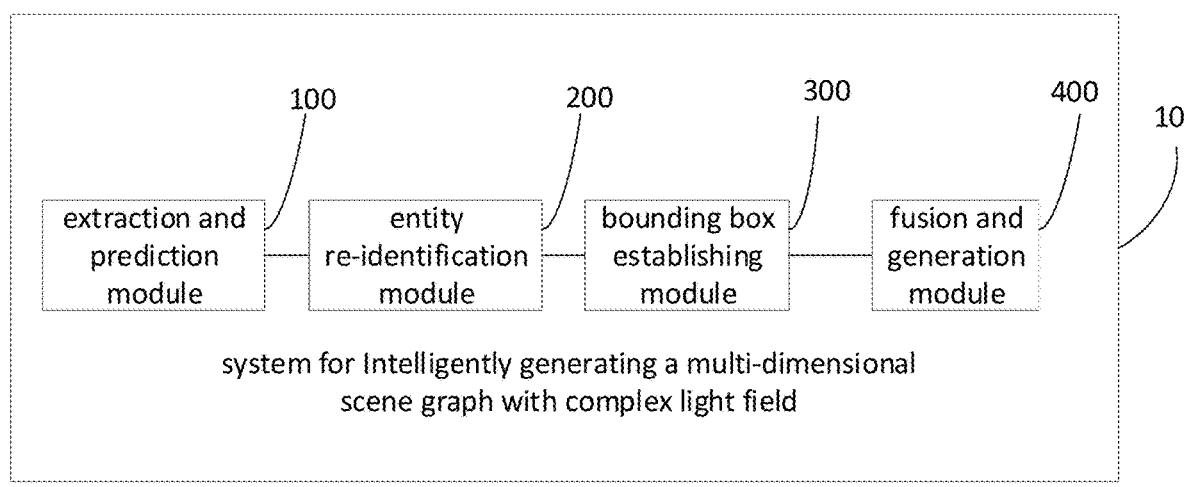
FIG. 5 is a schematic diagram illustrating a system for intelligently generating a multi-dimensional scene graph with a complex light field according to embodiments of the disclosure.

To achieve the above embodiments, as illustrated in FIG. 5, a system 10 for intelligently generating a complex multi-dimensional light field scene graph is provided. The system 10 includes: an extraction and prediction module 100, an entity re-identification module 200, a bounding box establishing module 300, and a fusion and generation module 400.

The extraction and prediction module 100 is configured to obtain entity features of entities by inputting respective 2-Dimensional (2D) images captured in multiple view directions into an object detection model for object detection, and obtain features of a respective single-view-direction scene graph by predicting, using an object relation prediction model, a semantic relation among the entities contained in a corresponding 2D image captured in each view direction.

The entity re-identification module 200 is configured to determine, based on a multi-view-direction consistency and a feature comparison result of the entity features, an entity correlation for an entity among the multiple view directions, as an entity re-identification result.

The bounding box establishing module 300 is configured to establish a multi-dimensional bounding box for the entity based on the entity re-identification result and a geometric constraint of camera parameters.

The fusion and generation module 400 is configured to obtain a feature fusion result by fusing, using a multi-view-direction information fusion algorithm, features of respective single-view-direction scene graphs in the multiple view directions, and establish the multi-dimensional scene graph with the complex light field based on the feature fusion result and an inferred multi-dimensional semantic relation among entities based on the multi-dimensional bounding box.

The object detection model is a Faster Region Convolutional Neural Network (RCNN) model. The system is further configured to:

obtain a rectangular object proposal outputted by a Region Proposal Network (RPN) by inputting an image from a single view into the RPN, in which the rectangular object proposal has an object score, obtaining the object score of the rectangular object proposal is modeled by a fully convolutional network with a loss function, the loss function is represented by:

$$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*).$$

in which, i represents a respective index of each anchor point: $p_i$ represents a prediction probability that an anchor i becomes an object, in which a basic ground-truth value label $p_i^*$ is 1 if the anchor is positive, and the basic ground-truth value label $p_i^*$ is 0 if the anchor is negative: $T_i$ represents a vector representing 4 parameterized coordinates of the multi-dimensional bounding box: $T_i$ represents a ground-truth bounding box associated with a positive anchor: $L_{cls}$ represents a classification loss: $L_{reg}$ represents a regression loss, which is defined as $L_{reg}(t_i, t_i^*)=R(t_i-t_i^*)$, where R is a predefined smooth L1 loss function, in which the classification loss and the regression loss are normalized using $N_{cls}$ and $N_{reg}$ respectively and balanced with $\lambda$.

The entity re-identification module 200 is further configured to:
- obtain an internal parameter matrix, represented by $K_1$, of a first camera, obtain an internal parameter matrix represented by $K_2$, of a second camera, obtain an external parameter, represented by R, of a first coordinate system and an external parameter, represented by t, of a second coordinate system, obtain a first image point, represented by $P_1(u_1,v_1,1)$, of a world point P and a second image point, represented by $P_2(u_2,v_2,1)$, of the world point P;
- obtain a polar cone by transforming midpoints of vertical edges of the object bounding box of the first camera into a coordinate system of the second camera, the polar cone is represented by:

$$(u_2 \; v_2 \; 1)K_2^{-T} \cdot t^A \cdot R \cdot K_1^{-1} \begin{pmatrix} u_1 \\ v_1 \\ 1 \end{pmatrix} = 0;$$

obtain a final entity re-identification result by comparing features between the object bounding box in the first camera and the object bounding box in the second camera. The polar cone of the object bounding box in the first camera intersects with the object bounding box in the second camera.

The multi-view-direction information fusion algorithm in the fusion and generation module 400 is based on a Dempster Shafer evidence theory.

A Dempster fusion rule $M=\{\{b^k\}_{k=1}^K, u\}$ of two independent input signals with probability distribution $M_1=\{\{b_1^k\}_{k=1}^K, u_1\}$ and $M_2=\{\{b_2^k\}_{k=1}^K, u_2\}$ respectively is represented by:

$$b^k = \frac{1}{1-C}(b_1^k b_2^k + b_1^k u_2 + b_1^k u_1), \; u = \frac{1}{1-C} u_1 u_2,$$

in which C represents a measures of confliction between two sets, $$\frac{1}{1-C}$$

represents a scale factor for normalization.

Corresponding joint evidence and Dirichlet distribution parameter are obtained as:

$$S = \frac{K}{u}, \; e^k = b^k \times S, \; \alpha^k = e^k + 1.$$

An estimated multi-view-direction joint evidence e and a joint Dirichlet distribution parameter $\alpha$ are obtained based on the above fusion rule.

The fusion and generation module 400 is further configured to: obtain the inferred multi-dimensional semantic relation for the entity based on the multi-dimensional bounding box, based on the multi-view-direction joint evidence e and the corresponding joint Dirichlet distribution parameter $\alpha$.

With the system for intelligent generating a complex multi-dimensional light field scene graph according to embodiments of the disclosure, the images in the multiple view directions are acquired, the images are processed by the deep neural network to obtain 2D semantic features in each view direction. The effective feature fusion is realized with the multi-view-direction consistency constraint using the internal and external parameters of the camera to establish multi-dimensional semantic features and to obtain the multi-dimensional semantic scene graph of the whole scene. This system can effectively reconstruct the semantic information of the multi-dimensional scene, which requires less cost of hardware system, the algorithm is simple and easy to implement.

Figure 6:
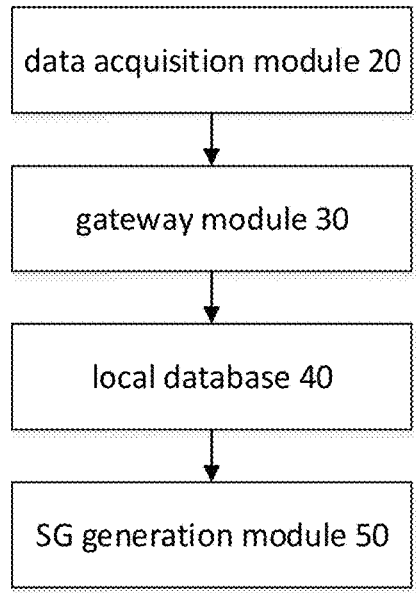
FIG. 6 is a schematic diagram illustrating an apparatus for intelligently generating a multi-dimensional scene graph with a complex light field according to embodiments of the disclosure.

In order to achieve the above embodiments, as illustrated in FIG. 6, an apparatus for intelligently generating a multi-dimensional scene graph with a complex light field is provided. The apparatus includes: a data acquisition module 20, a gateway module 30, a local database 40 and a scene graph generation module 50.

The scene graph generation module 50 is configured to:
- obtain entity features of entities by inputting respective 2-Dimensional (2D) images captured in multiple view directions stored in the local database into an object detection model for object detection, and obtain features of a respective single-view-direction scene graph by predicting, using an object relation prediction model, a semantic relation among the entities contained in a corresponding 2D image captured in each view direction;
- determine, based on a multi-view-direction consistency and a feature comparison result of the entity features, an entity correlation for an entity among the multiple view directions, as an entity re-identification result;
- establish a multi-dimensional bounding box for the entity based on the entity re-identification result and a geometric constraint of camera parameters; and
- obtain a feature fusion result by fusing, using a multi-view-direction information fusion algorithm, features of respective single-view-direction scene graphs in the multiple view directions, and establish the multi-dimensional scene graph with the complex light field based on the feature fusion result and an inferred multi-dimensional semantic relation for the entity based on the multi-dimensional bounding box.

In the description of the disclosure, the reference terms "an embodiment", "some embodiments", "example", "specific example", and "some examples" and the like are intended to describe specific features, structures, materials, or characteristics described in combination with the embodiment or example are included in at least one embodiment or example of the disclosure. In this disclosure, the schematic expressions of the above terms do not have to be directed to the same embodiments or examples. Moreover, the specific features, structures, materials, or characteristics described may be combined in a suitable manner in any one or more embodiments or examples. In addition, without contradicting each other, those skilled in the art may combine different embodiments or examples described in this disclosure and features of different embodiments or examples.

In addition, terms such as "first" and "second" are used herein for purposes of description and are not intended to indicate or imply relative importance or significance or to imply the number of indicated technical features. The feature defined with "first" or "second" may explicitly or implicitly include at least one of these features. In the description of the disclosure, "a plurality of" means at least two, for example, two or three, unless specified otherwise.

What is claimed is:

1. A method for generating a multi-dimensional scene graph with a complex light field, comprising:
   obtaining entity features of entities by inputting respective 2-Dimensional (2D) images captured in multiple view directions into an object detection model for object detection, and obtaining features of a respective single-view-direction scene graph by predicting, using an object relation prediction model, a semantic relation among the entities contained in a corresponding 2D image captured in each view direction;
   determining, based on a multi-view-direction consistency and a feature comparison result of the entity features, an entity correlation for an entity among the multiple view directions, as an entity re-identification result;
   establishing a multi-dimensional bounding box for the entity based on the entity re-identification result and a geometric constraint of camera parameters; and
   obtaining a feature fusion result by fusing, using a multi-view-direction information fusion algorithm, the features of respective single-view-direction scene graphs in the multiple view directions, and establishing the multi-dimensional scene graph with the complex light field based on the feature fusion result and an inferred multi-dimensional semantic relation among the entities based on the multi-dimensional bounding box;
   wherein determining, based on the multi-view-direction consistency and the feature comparison result of the entity features, the entity correlation for the entity among the multiple view directions, as the entity re-identification result comprises:
      obtaining an internal parameter matrix, represented by $K_1$, of a first camera, obtaining an internal parameter matrix represented by $K_2$, of a second camera, obtaining an external parameter, represented by R, of a first coordinate system and an external parameter, represented by t, of a second coordinate system, obtaining a first image point, represented by $P_1(u_1, v_1, 1)$, of a world point P and a second image point, represented by $P_2(u_2, v_2, 1)$, of the world point P;
      obtaining a polar cone by transforming midpoints of vertical edges of an object bounding box of the first camera into a coordinate system of the second camera, wherein the polar cone is represented by:

$$(u_2 \ v_2 \ 1) K_2^{-T} \cdot t^A \cdot R \cdot K_1^{-1} \begin{pmatrix} u_1 \\ v_1 \\ 1 \end{pmatrix} = 0; \text{ and}$$

obtaining a final entity re-identification result by comparing features between the object bounding box in the first camera and an object bounding box in the second camera, wherein the polar cone of the object bounding box in the first camera intersects with the object bounding box in the second camera.

2. The method of claim 1, wherein the object detection model is a Faster Region Convolutional Neural Network (RCNN) model;
   wherein the method further comprises:
      obtaining a rectangular object proposal outputted by a Region Proposal Network (RPN) by inputting an image from a single view into the RPN, wherein the rectangular object proposal has an object score, and obtaining the object score of the rectangular object proposal is modeled by a fully convolutional network with a loss function, the loss function is represented by:

$$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

where i represents a respective index of each anchor point; $p_i$ represents a prediction probability that an anchor i becomes an object, in which a basic ground-truth value label $p_i^*$ is 1 if the anchor i is positive, and the basic ground-truth value label $p_i^*$ is 0 if the anchor i is negative; $T_i$ represents a vector representing 4 parameterized coordinates of the multi-dimensional bounding box; $T_i$ represents a ground-truth bounding box associated with a positive anchor; $L_{cls}$ represents a classification loss; $L_{reg}$ represents a regression loss, which is defined as $L_{reg}(t_i, t_i^*) = R(t_i - t_i^*)$, where R is a predefined smooth L1 loss function, in which the classification loss and the regression loss are normalized using $N_{cls}$ and $N_{reg}$ respectively and balanced with $\lambda$.

3. The method of claim 1, wherein the multi-view-direction information fusion algorithm is based on a Dempster Shafer evidence theory;
   wherein a Dempster fusion rule $M=\{\{b^k\}_{k=1}^K, u\}$ of two independent input signals with probability distribution $M_1=\{\{b_1^k\}_{k=1}^K, u_1\}$ and $M_2=\{\{b_2^k\}_{k=1}^K, u_2\}$ respectively is represented by:

$$b^k = \frac{1}{1-C}(b_1^k b_2^k + b_1^k u_2 + b_1^k u_1), u = \frac{1}{1-C} u_1 u_2,$$

in which C represents a measures of confliction between two sets, $$\frac{1}{1-C}$$

represents a scale factor for normalization;
   a corresponding joint evidence and a Dirichlet distribution parameter are obtained as:

$$S = \frac{K}{u}, e^k = b^k \times S, \alpha^k = e^k + 1;$$

an estimated multi-view-direction joint evidence e and a joint Dirichlet distribution parameter α are obtained based on the Dempster fusion rule.

4. The method of claim 3, further comprising:
   obtaining the inferred multi-dimensional semantic relation for the entity based on the multi-dimensional bounding box, based on the multi-view-direction joint evidence e and the corresponding joint Dirichlet distribution parameter α.

5. An electronic device, comprising:
   a processor; and
   a memory, for storing a computer program executable by the processor,
   wherein when the computer program is executed by the processor, the processor is configured to:

obtain entity features of entities by inputting respective 2-Dimensional (2D) images captured in multiple view directions into an object detection model for object detection, and obtain features of a respective single-view-direction scene graph by predicting, using an object relation prediction model, a semantic relation among the entities contained in a corresponding 2D image captured in each view direction;

determine, based on a multi-view-direction consistency and a feature comparison result of the entity features, an entity correlation for an entity among the multiple view directions, as an entity re-identification result;

establish a multi-dimensional bounding box for the entity based on the entity re-identification result and a geometric constraint of camera parameters; and obtain a feature fusion result by fusing, using a multi-view-direction information fusion algorithm, the features of respective single-view-direction scene graphs in the multiple view directions, and establish a multi-dimensional scene graph with a complex light field based on the feature fusion result and an inferred multi-dimensional semantic relation among the entities based on the multi-dimensional bounding box;

wherein the processor is further configured to:

obtain an internal parameter matrix, represented by $K_1$, of a first camera, obtain an internal parameter matrix represented by $K_2$, of a second camera, obtain an external parameter, represented by R, of a first coordinate system and an external parameter, represented by t, of a second coordinate system, obtain a first image point, represented by $P_1(u_1,v_1,1)$, of a world point P and a second image point, represented by $P_2(u_2,v_2,1)$, of the world point P;

obtain a polar cone by transforming midpoints of vertical edges of an object bounding box of the first camera into a coordinate system of the second camera, wherein the polar cone is represented by:

$$(u_2 \ v_2 \ 1) K_2^{-T} \cdot t^A \cdot R \cdot K_1^{-1} \begin{pmatrix} u_1 \\ v_1 \\ 1 \end{pmatrix} = 0; \text{ and}$$

obtain a final entity re-identification result by comparing features between the object bounding box in the first camera and an object bounding box in the second camera, wherein the polar cone of the object bounding box in the first camera intersects with the object bounding box in the second camera.

6. The electronic device of claim 5, wherein the object detection model is a Faster Region Convolutional Neural Network (RCNN) model;

wherein the processor is further configured to:

obtain a rectangular object proposal outputted by a Region Proposal Network (RPN) by inputting an image from a single view into the RPN, wherein the rectangular object proposal has an object score and obtaining the object score of the rectangular object proposal is modeled by a fully convolutional network with a loss function, the loss function is represented by:

$$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

where i represents a respective index of each anchor point; $p_j$ represents a prediction probability that an anchor i becomes an object, in which a basic ground-truth value label $p_i^*$ is 1 if the anchor i is positive, and the basic ground-truth value label $p_i^*$ is 0 if the anchor i is negative; $T_i$ represents a vector representing 4 parameterized coordinates of the multi-dimensional bounding box; $T_i$ represents a ground-truth bounding box associated with a positive anchor; $L_{cls}$ represents a classification loss; $L_{reg}$ represents a regression loss, which is defined as $L_{reg}(t_i, t_i^*)=R(t_i-t_i^*)$, where R is a predefined smooth L1 loss function, in which the classification loss and the regression loss are normalized using $N_{cls}$ and $N_{reg}$ respectively and balanced with $\lambda$.

7. The electronic device of claim 5, wherein the multi-view-direction information fusion algorithm is based on a Dempster Shafer evidence theory;

wherein a Dempster fusion rule $M=\{\{b^k\}_{k=1}^K, u\}$ of two independent input signals with probability distribution $M_1=\{\{b_1^k\}_{k=1}^K, u_1\}$ and $M_2=\{\{b_2^k\}_{k=1}^K, u_2\}$ respectively is represented by:

$$b^k = \frac{1}{1-C}(b_1^k b_2^k + b_1^k u_2 + b_1^k u_1), u = \frac{1}{1-C} u_1 u_2,$$

in which C represents a measures of confliction between two sets, $$\frac{1}{1-C}$$

represents a scale factor for normalization;

a corresponding joint evidence and a Dirichlet distribution parameter are obtained as:

$$S = \frac{K}{u}, e^k = b^k \times S, \alpha^k = e^k + 1;$$

an estimated multi-view-direction joint evidence e and a joint Dirichlet distribution parameter α are obtained based on the Dempster fusion rule.

8. The electronic device of claim 7, wherein the processor is further configured to:

obtain the inferred multi-dimensional semantic relation for the entity based on the multi-dimensional bounding box, based on the multi-view-direction joint evidence e and the corresponding joint Dirichlet distribution parameter α.

9. A non-transitory computer-readable storage medium, having a computer program stored thereon, wherein when the computer program is executed by a processor of an electronic device, the processor is configured to perform a method for intelligently generating a multi-dimensional scene graph with a complex light field, the method comprising:

obtaining entity features of entities by inputting respective 2-Dimensional (2D) images captured in multiple view directions into an object detection model for object detection, and obtaining features of a respective single-view-direction scene graph by predicting, using an object relation prediction model, a semantic relation among the entities contained in a corresponding 2D image captured in each view direction;

determining, based on a multi-view-direction consistency and a feature comparison result of the entity features, an entity correlation for an entity among the multiple view directions, as an entity re-identification result;

establishing a multi-dimensional bounding box for the entity based on the entity re-identification result and a geometric constraint of camera parameters; and obtaining a feature fusion result by fusing, using a multi-view-direction information fusion algorithm, the features of respective single-view-direction scene graphs in the multiple view directions, and establishing the multi-dimensional scene graph with the complex light field based on the feature fusion result and an inferred multi-dimensional semantic relation among the entities based on the multi-dimensional bounding box;

wherein determining, based on the multi-view-direction consistency and the feature comparison result of the entity features, the entity correlation for the entity among the multiple view directions, as the entity re-identification result comprises:

obtaining an internal parameter matrix, represented by $K_1$, of a first camera, obtaining an internal parameter matrix represented by $K_2$, of a second camera, obtaining an external parameter, represented by R, of a first coordinate system and an external parameter, represented by t, of a second coordinate system, obtaining a first image point, represented by $P_1(u_1, v_1, 1)$, of a world point P and a second image point, represented by $P_2(u_2, v_2, 1)$, of the world point P;

obtaining a polar cone by transforming midpoints of vertical edges of an object bounding box of the first camera into a coordinate system of the second camera, wherein the polar cone is represented by:

$$(u\ v\ 1)K_2^{-T} \cdot t^{TT} R \cdot K_1^{-1}\begin{pmatrix} u_1 \\ v_1 \end{pmatrix} = 0; \text{ and}$$

obtaining a final entity re-identification result by comparing features between the object bounding box in the first camera and an object bounding box in the second camera, wherein the polar cone of the object bounding box in the first camera intersects with the object bounding box in the second camera.

10. The non-transitory computer-readable storage medium of claim 9, wherein the object detection model is a Faster Region Convolutional Neural Network (RCNN) model;

wherein the method further comprises:

obtaining a rectangular object proposal outputted by a Region Proposal Network (RPN) by inputting an image from a single view into the RPN, wherein the rectangular object proposal has an object score, and obtaining the object score of the rectangular object proposal is modeled by a fully convolutional network with a loss function, the loss function is represented by:

$$L(\{p_i\}, \{t_i\}) = \frac{1}{N_{cls}}\sum_i L_{cls}(p_i, p_i^*) + \lambda \frac{1}{N_{reg}}\sum_i p_i^* L_{reg}(t_i, t_i^*),$$

where i represents a respective index of each anchor point; $p_i$ represents a prediction probability that an anchor i becomes an object, in which a basic ground-truth value label $p_i^*$ is 1 if the anchor i is positive, and the basic ground-truth value label $p_i^*$ is 0 if the anchor i is negative; $T_i$ represents a vector representing 4 parameterized coordinates of the multi-dimensional bounding box; $T_i$ represents a ground-truth bounding box associated with a positive anchor; $L_{cls}$ represents a classification loss; $L_{reg}$ represents a regression loss, which is defined as $L_{reg}(t_i, t_i^*)=R(t_i-t_i^*)$, where R is a predefined smooth L1 loss function, in which the classification loss and the regression loss are normalized using $N_{cls}$ and $N_{reg}$ respectively and balanced with $\lambda$.

11. The non-transitory computer-readable storage medium of claim 9, wherein the multi-view-direction information fusion algorithm is based on a Dempster Shafer evidence theory;

wherein a Dempster fusion rule $M=\{\{b^k\}_{k=1}^K, u\}$ of two independent input signals with probability distribution $M_1=\{\{b_1^k\}_{k=1}^K, u_1\}$ and $M_2=\{\{b_2^k\}_{k=1}^K, u_2\}$ respectively is represented by:

$$b^k = \frac{1}{1-C}(b_1^k b_2^k + b_1^k u_2 + b_1^k u_1), u = \frac{1}{1-C}u_1 u_2,$$

in which C represents a measures of confliction between two sets, $$\frac{1}{1-C}$$

represents a scale factor for normalization;

a corresponding joint evidence and a Dirichlet distribution parameter are obtained as:

$$S = \frac{K}{u}, e^k = b^k \times S, \alpha^k = e^k + 1;$$

an estimated multi-view-direction joint evidence e and a joint Dirichlet distribution parameter $\alpha$ are obtained based on the Dempster fusion rule.

12. The non-transitory computer-readable storage medium of claim 11, wherein the method further comprises:

obtaining the inferred multi-dimensional semantic relation for the entity based on the multi-dimensional bounding box, based on the multi-view-direction joint evidence e and the corresponding joint Dirichlet distribution parameter $\alpha$.

* * * * *